United States Patent
Park et al.

(10) Patent No.: US 10,741,810 B2
(45) Date of Patent: Aug. 11, 2020

(54) BATTERY PACK CASE AND METHOD FOR MANUFACTURING THE SAME

(71) Applicant: LG CHEM, LTD., Seoul (KR)

(72) Inventors: Geon Tae Park, Chungcheongbuk-Do (KR); Ju Hwan Baek, Chungcheongbuk-Do (KR); Pan Jung Kwon, Gyeonggi-Do (KR); Jung Ho Oh, Seoul (KR)

(73) Assignee: LG Chem, Ltd., Seoul (KR)

( * ) Notice: Subject to any disclaimer, the term of this patent is extended or adjusted under 35 U.S.C. 154(b) by 96 days.

(21) Appl. No.: 15/948,112

(22) Filed: Apr. 9, 2018

(65) Prior Publication Data

US 2018/0366705 A1 Dec. 20, 2018

(30) Foreign Application Priority Data

Jun. 19, 2017 (KR) .......................... 10-2017-0077434

(51) Int. Cl.
*H01M 2/10* (2006.01)

(52) U.S. Cl.
CPC ....... *H01M 2/1094* (2013.01); *H01M 2/1022* (2013.01); *H01M 2/1077* (2013.01)

(58) Field of Classification Search
None
See application file for complete search history.

(56) References Cited

U.S. PATENT DOCUMENTS

| 7,677,830 B1 * | 3/2010 | Brown ..................... A47C 3/00 403/381 |
|---|---|---|
| 2012/0012193 A1 | 5/2012 | Kwag et al. |
| 2014/0238980 A1 | 8/2014 | Yamaguchi et al. |
| 2014/0335401 A1 * | 11/2014 | Wohrle ............... H01M 2/0262 429/163 |
| 2015/0079449 A1 | 3/2015 | Kim et al. |
| 2016/0104873 A1 * | 4/2016 | Smythe ............... H01M 10/482 429/56 |

FOREIGN PATENT DOCUMENTS

| JP | 2002-237280 A | | 8/2002 |
| KR | 10-2008-25424 A | | 3/2008 |
| KR | 20080025424 | * | 3/2008 |
| KR | 10-1201057 B1 | | 11/2012 |
| KR | 10-1520902 B1 | | 5/2015 |
| KR | 10-1524967 B1 | | 6/2015 |

OTHER PUBLICATIONS

KR 20080025424 Kim espacenet machine translation (Year: 2008).*
Korean Office Action dated Sep. 20, 2019, issued in counterpart Korean Patent application No. 10-2017-0077434.

* cited by examiner

*Primary Examiner* — Jonathan G Leong
*Assistant Examiner* — Kirsten B Tysl
(74) *Attorney, Agent, or Firm* — Morgan, Lewis & Bockius LLP (57) ABSTRACT

A battery pack case prevents moisture from being permeated into a battery pack with an easily assembled structure. The battery pack case includes an upper pack case and a lower pack case that are slidably coupled with each other. The upper pack case includes a coupling protrusion, and the lower pack case includes a coupling groove such that a bonding member is at portion at which the coupling protrusion and the coupling groove come into contact with each other.

5 Claims, 5 Drawing Sheets

FIG. 1

RELATED ART

BATTERY PACK CASE AND METHOD FOR MANUFACTURING THE SAME

CROSS-REFERENCE TO RELATED APPLICATION

This application claims priority to Korean Patent Application No. 10-2017-0077434 filed on Jun. 19, 2017 the disclosure of which is incorporated herein by reference in its entirety.

TECHNICAL FIELD

The present disclosure relates to a battery pack case and a method for manufacturing the same, and more particularly, to a battery pack case which prevents moisture from being permeated into a battery pack and is easily assembled and a method for manufacturing the same.

RELATED ART

Typical battery cells are lithium secondary batteries, which are classified into cylindrical type batteries, prismatic type batteries, and pouch type batteries in accordance with a shape of a cell case. Such a lithium secondary battery is lightweight and has excellent safety, and thus, demand for portable electronic devices such as mobile phones, camcorders, and notebook computers is increasing.

Also, secondary batteries have attracted considerable attention as power sources for electric vehicles (EVs), hybrid electric vehicles (HEVs), and plug-in hybrid electric vehicles (PHEVs), which have been developed to solve limitations, such as air pollution, caused by existing gasoline and diesel vehicles that use fossil fuels.

Such a secondary battery generally uses one to four battery cells per small device. In medium- and large-sized devices such as vehicles, a battery pack in which a plurality of battery cells are electrically connected to each other is used due to the necessity of high output large capacity.

Since the secondary battery constituted by the plurality of cells is vulnerable to an impact, when an external stab or impact occurs, explosion or ignition may occur due to chemicals within the secondary battery.

To solve this limitation, a case is provided on the secondary battery. A case in accordance with the related art will be described with reference to FIG. 1.

Figure 1:
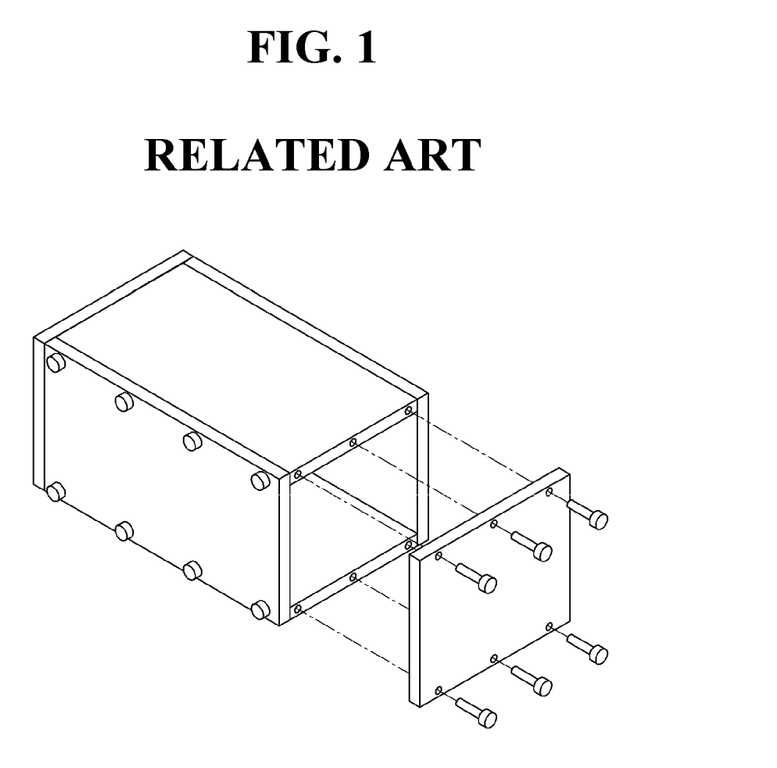
FIG. 1 is a perspective view of a case in accordance with a related art.

FIG. 1 is a perspective view of the case in accordance with the related art.

Referring to FIG. 1, the case in accordance with the related art includes panels that are respectively disposed on upper and lower portions, both side surfaces, and front and rear surfaces, and each of the panels is assembled through a screw or a bolt.

However, such an assembled structure has risk of damage and electric shock of the secondary battery due to introduction of external moisture such as rainwater.

Also, in order to solve the limitation of the moisture permeation, a waterproof sheet or glue is attached/applied to the assembled portion of the case, or an O-ring made of rubber is additionally provided in accordance with the related art.

However, the battery with the waterproof function has a long assembly time due to the coupling of the screw or the bolt.

In addition, a waterproof sheet or an O-ring corresponding to each assembled portion has to be additionally manufactured, and the simply applied glue may not be properly distributed. Thus, moisture may be introduced through a portion of the connection portion of the case.

Thus, it is required to develop a technique that is capable of easily assembling the battery pack case and surely preventing moisture form being permeated into the battery.

PRIOR ART DOCUMENT

Patent Document (Patent Document 1) KR10-1520902 B

SUMMARY

The present disclosure provides a battery pack case that is capable of more effectively preventing moisture from being permeated into a battery pack and a method for manufacturing the same.

In accordance with another exemplary embodiment, a battery pack case in which an upper pack case and a lower pack case are assembled with each other through slidable coupling includes: a coupling protrusion (111) protruding from an entire end of a lower frame on four side surfaces of the upper pack case; a coupling groove (121) corresponding to the coupling protrusion and defined in an entire end of a upper frame on four side surfaces of the lower pack case; and a bonding member (130) disposed on a portion at which the coupling protrusion and the coupling groove come into contact with each other and injected into the coupling groove, wherein the lower pack case has an injection hole (122) through which the bonding member is injected into an outer surface in which the coupling groove is defined.

The coupling protrusion disposed on each of any facing two surfaces of the four side surfaces of the upper pack case may include: a protrusion connection part connected to the upper pack case; and a coupling part disposed on a lower end of the protrusion connection part to protrude projection protrude on both sides thereof.

The protrusion connection parts of the coupling protrusion disposed on the any facing two surfaces of the four side surfaces of the upper pack case may have the same height.

The coupling protrusion disposed on the any facing two surfaces of the four side surfaces of the upper pack case have heights different from the coupling protrusion disposed on other facing two surfaces except for the any two surfaces.

The coupling groove defined in each of any facing two surfaces of the four side surfaces of the lower pack case may have a hook protrusion that is slidably coupled to the coupling protrusion.

The coupling groove having the hook protrusion may be slidably coupled to the corresponding coupling protrusion.

The bonding member may be injected in a liquid phase when being injected and is cured after the injection.

In accordance with yet another exemplary embodiment, a method for manufacturing a battery pack case includes: an upper and lower pack case generation process of generating an upper pack case on which a coupling protrusion is formed and a lower pack case in which a coupling groove is formed; a case coupling process of slidably coupling the coupling protrusion of each of any facing two surfaces of four side surfaces of the upper pack case to the corresponding coupling groove of the lower pack case; and a bonding member injection process of injecting a bonding member into the coupling groove of the lower pack case.

The method may further include, before the bonding member injection process, an upper pack case fixing process of lifting the upper pack case coupled in the case coupling process upward to temporarily fix the upper pack case.

The method may further include, after the bonding member injection process, a fixing release process of releasing the fixing of the upper pack case that is temporarily fixed in an upper pack case fixing process.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, embodiments of the present invention will be described in detail with reference to the accompanying drawings. However, the present invention is not limited to the embodiments below. Rather, these embodiments are provided so that this disclosure will be thorough and complete, and will fully convey the scope of the present invention to those skilled in the art.

Also, it will be understood that although the ordinal numbers such as first and second are used herein to describe various elements, these elements should not be limited by these numbers. The terms are only used to distinguish one component from other components. For example, a first element referred to as a first element in one embodiment can be referred to as a second element in another embodiment without departing from the scope of the appended claims. In the following description, the technical terms are used only for explaining a specific exemplary embodiment while not limiting the present invention. The terms of a singular form may include plural forms unless referred to the contrary.

While the term used in the present invention selects general terms that are widely used at present in consideration of the functions of the present invention, it is to be understood that this may vary depending on the intention or circumstance of those skilled in the art, the emergence of new technology, and the like. Also, in certain cases, there may be a term chosen arbitrarily by the applicant, and in this case, the meaning thereof will be described in detail in the description of the corresponding invention. Thus, the term used in the present invention should be defined based on the meaning of the term, not on the name of a simple term, but on the entire contents of the present invention.

Embodiment 1

Hereinafter, a battery pack case in accordance with an exemplary embodiment will be described.

A battery pack case in accordance with an exemplary embodiment includes a coupling protrusion and a coupling groove at a connection portion between the battery pack cases to perform slidable coupling.

Also, a bonding member is injected into the portion at which the coupling protrusion and the coupling groove are coupled to each other to prevent moisture from being permeated into the battery pack and firmly couple the battery pack cases to each other.

Figure 2:
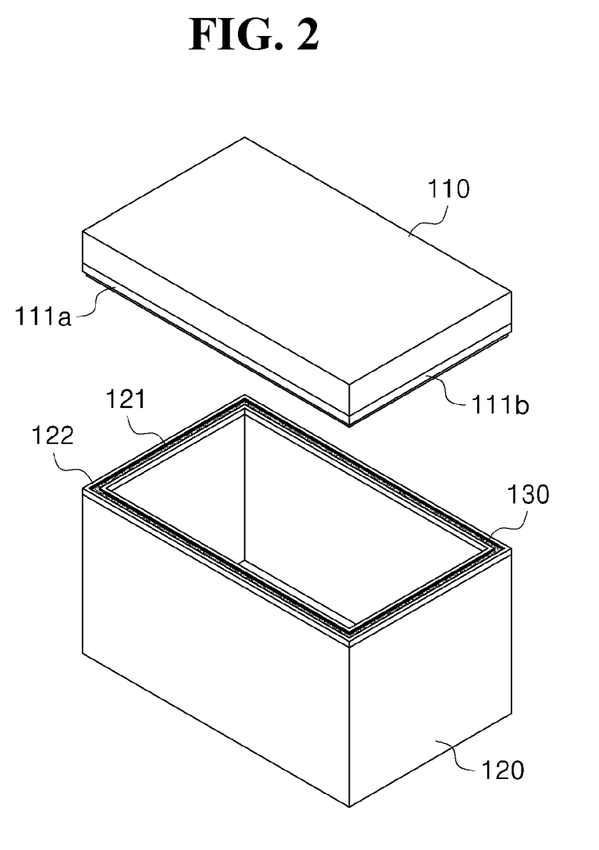
FIG. 2 is a perspective view of a battery pack case in accordance with an exemplary embodiment.

FIG. 2 is a perspective view of the battery pack case in accordance with an exemplary embodiment.

Referring to FIG. 2, the battery pack case 100 in accordance with an exemplary embodiment includes a coupling protrusion 111 at which an upper pack case 110 and a lower pack case 120 are assembled with each other through slidable coupling and protruding from an entire end of a lower frame on four side surface of the upper pack case, a coupling groove 121 corresponding to the coupling protrusion and defined in an entire end of an upper frame on four side surface of the lower pack case, and a bonding member 130 disposed on a portion at which the coupling protrusion 111 and the coupling groove 121 come into contact with each other and injected into the coupling groove 121.

Also, the lower pack case has an injection hole 122, through which the bonding member is injected, in an outer surface in which the coupling groove 121 is defined.

The coupling protrusion 111 and the coupling groove 121 of the upper pack case 1110 and the lower pack case 120 may be provided to be exchanged with each other. That is, the coupling groove 121 may be defined in the upper pack case 110, and the coupling protrusion 111 may be disposed on the lower pack case 120.

Also, each of the constituents of the battery pack case 100 will be described in more detail.

The lower pack case 120 includes a plurality of battery cells and a MCU for controlling the battery cells and has a size greater than that of the upper pack case 110.

Also, the upper pack case 110 may cover the constituents accommodated in the lower pack case 120 and also may be provided as a plate-shape cover as well as a case-shaped cover.

The upper pack case 110 and the lower pack case 120 may be integrated with each other. Alternatively, like the coupling between the upper pack case 110 and the lower pack case 120, the bonding member 130 may be injected into the slidably coupled portion to assembly the upper pack case 110 with the lower pack case 120.

The assembled structure between the upper pack case 110 and the lower pack case 120 will be described in more detail with reference to FIG. 3.

Figure 3:
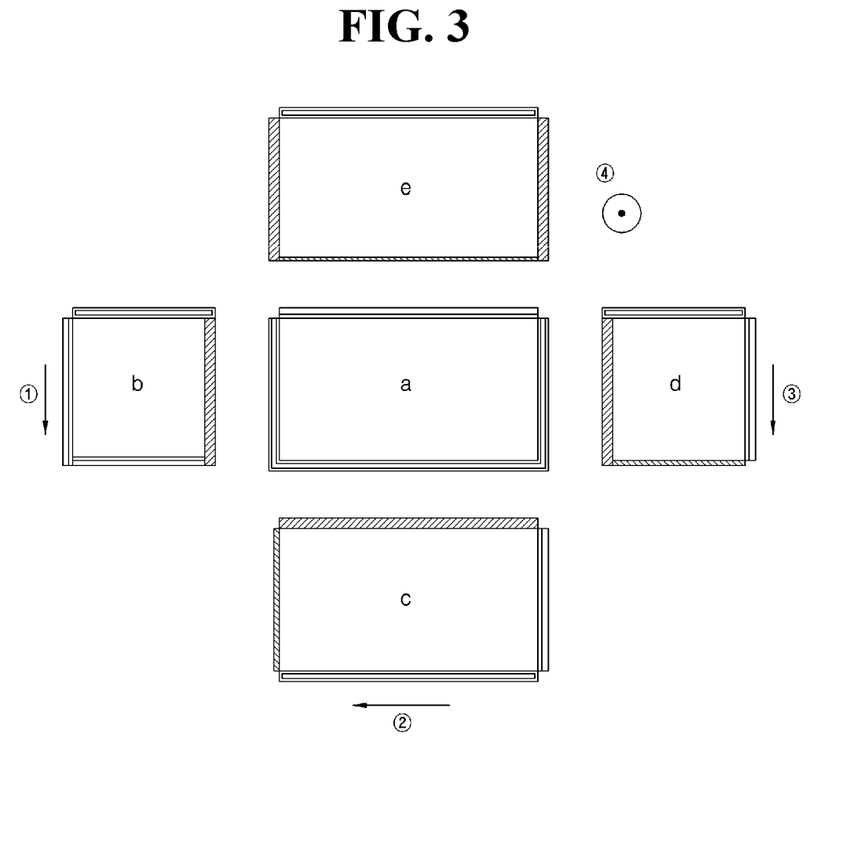
FIG. 3 is a schematic view illustrating an assembled structure of the battery pack case in accordance with an exemplary embodiment.

FIG. 3 is a schematic view illustrating an assembled structure of the battery pack case in accordance with an exemplary embodiment.

Referring to FIG. 3, a panel a is defined as a bottom surface, and panels b, c, d, and e are provided as side surfaces. The panels are slidably assembled with each other in accordance with the numbered sequence.

First, a coupling groove 121 having a hook protrusion is defined in each of left and right sides and a lower end of the panel a so at be slidably coupled to each of the panels, and a coupling groove 121 having no hook production is defined in an upper end of the panel a is generally coupled.

Also, the bonding member 130 is injected into each of the coupled portion to couple the panels to each other as well as perform the waterproof function.

Also, a coupling protrusion 111 is disposed on a right portion of the panel b, and a coupling groove 121, which has no hook protrusion, in each of a left portion and a lower end of the panel b and thus is generally coupled. Also, a coupling groove 121 having a hook protrusion is disposed on an upper end of the panel b and thus is slidably coupled.

Also, a coupling protrusion 111 that is generally coupled is disposed on a left portion of the panel c, and a coupling protrusion 111 that is slidably coupled is disposed on an upper end of the panel c. Also, a coupling groove 121 having no hook protrusion is defined in a right portion of the panel c and thus is generally coupled. In addition, a coupling groove 121 having a hook protrusion that is slidably coupled to the other case is defined in a lower end of the panel c.

Also, a coupling protrusion 111 for the slidable coupling is disposed on a left portion of the panel d, and a coupling groove 121 having a hook protrusion is defined in an upper end of the panel d. Also, a coupling protrusion 111 that is generally coupled is disposed on a lower end of the panel d. Also, a coupling groove having no hook protrusion that is generally coupled to the other case is defined in a right portion of the panel d.

Also, a coupling protrusion 111 that is slidably coupled is disposed on each of left and right portions of the panel e, and a coupling protrusion 111 that is generally coupled is disposed on a lower end of the panel e. In addition, a coupling groove 121 having a hook protrusion that is slidably coupled to the other case is defined in an upper end of the panel e.

Here, since the assembled structure is based on the lower pack case 120, the upper pack case 110 may be provided by changing the coupling groves defined in the left portion of the panel b, the lower end of the panel c, the right portion of the panel c, and the upper end of the panel e into the coupling protrusion 111.

The coupling protrusion 111 of the upper pack case and the coupling groove 121 of the lower pack case will be described in more detail with reference to FIG. 4.

Figure 4:
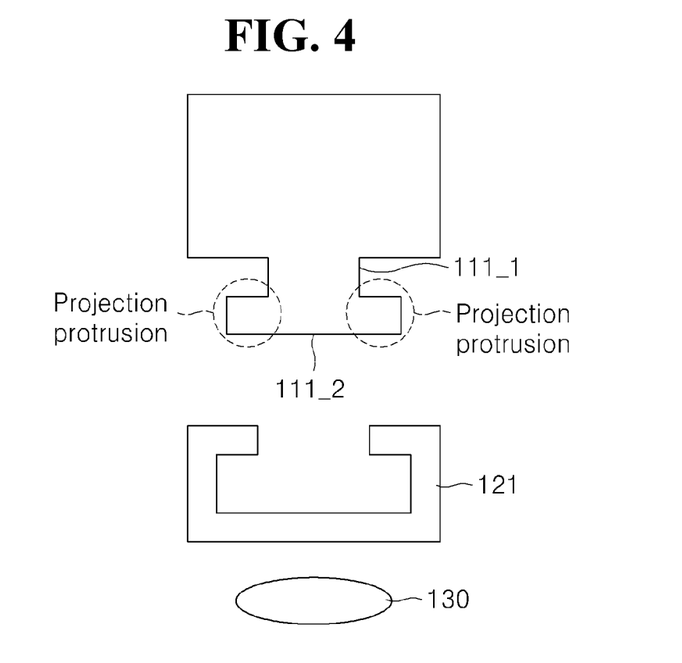
FIG. 4 is a view illustrating an assembled structure between a coupling protrusion and a coupling groove of the battery pack case in accordance with an exemplary embodiment.

FIG. 4 is a view illustrating an assembled structure between the coupling protrusion and the coupling groove of the battery pack case in accordance with an exemplary embodiment.

Referring to FIG. 4, the coupling protrusion 111 has a structure that protrudes from an entire end of the lower frame disposed on the four side surfaces of the upper pack case.

Also, the coupling protrusion 111 disposed on any facing two surfaces of the four side surfaces of the upper pack case include a protrusion connection part 111_1 connected to the upper pack case 110 and a coupling part 111_2 disposed on a lower end of the protrusion connection part and providing projection protrudes that protrude in both sides directions.

The projection connection part 111_1 is configured to adjust a height of the coupling protrusion 111. Also, the projection connection part 111_1 has the same height as that of the facing protrusion connection part 111_1 and has a height different from that of each of the protrusion connection parts 111_1 disposed on other different surfaces except for the facing surface.

Also, referring to FIG. 2, the protrusion connection part (reference numeral 111*a* of FIG. 2) that is slidably coupled has a height greater than that of the protrusion connection part (see reference numeral 111*b* of FIG. 2) that is not slidably coupled so that the battery pack case is easily assembled.

Also, each of both the projection protrusions of the coupling part 111_2 has a length greater than a width of an inlet of the coupling groove having the hook protrusion so that the coupling part 111_2 is hooked with the hook protrusion of the coupling groove 121.

Also, the coupling protrusion 111 that is not slidably coupled may exclude the coupling part 111_2 and have a convex shape in a simple uneven coupling shape.

Also, the coupling groove 121 corresponds to the coupling protrusion and is disposed on the entire end of the upper frame on the four side surfaces of the lower pack case, thereby preventing the coupling protrusion 111 from being separated by the hook protrusion when being slidably coupled. Here, the hook protrusion may be disposed on only any facing two surfaces of the four side surfaces of the lower pack case so that the portion that is not slidably coupled is coupled by using the general bonding member 130.

Thus, the coupling groove having the hook protrusion may be slidably coupled to the coupling protrusion corresponding thereto.

Also, the slidable coupling by the coupling groove 121 having the hook protrusion is performed on a long side rather than a short side so that the battery pack is more firmly coupled.

Also, the injection hole 122 is configured to inject the bonding member 130 into the outer surface of the lower pack case in which the coupling groove 121 is defined. Here, only one injection hole may be provided to quickly inject the bonding member 130, or a plurality of injection holes may be provided to easily inject the bonding member 130.

Also, in accordance with another exemplary embodiment, the hook protrusion may be entirely disposed on the coupling groove 121, and the coupling part 111_2 of the constituents of the coupling protrusion 111 may be removed except for the slidably coupled portion. Then, the protrusion connection part 111_1 may extend by the removed portion to prevent the bonding member 130 from being discharged from the generally connected portion.

The bonding member 130 is disposed on the portion at which the coupling protrusion 111 and the coupling groove 121 come into contact with each other and is injected into the coupling groove 121 to firmly connect the battery pack cases to each other, thereby preventing moisture from being permeated into the battery pack.

Thus, the bonding member 130 is made of a material having adhesiveness and waterproof property.

Also, when the bonding member 130 is injected in a liquid phase and then is cured after being injected. Thus, the bonding member 130 may be easily injected into the coupling groove 121.

Embodiment 2

Hereinafter, a method for manufacturing the battery pack case in accordance with an exemplary embodiment will be described.

In a method for manufacturing the battery pack case in accordance with an exemplary embodiment, an upper pack case and a lower pack case are slidably coupled to each other, and a bonding member is injected in a state in which the upper pack case is lifted up so that the bonding member is more densely distributed in the coupling protrusion and the coupling groove to improve the coupling between the upper and lower pack cases and the waterproof property of the battery pack case.

Figure 5:
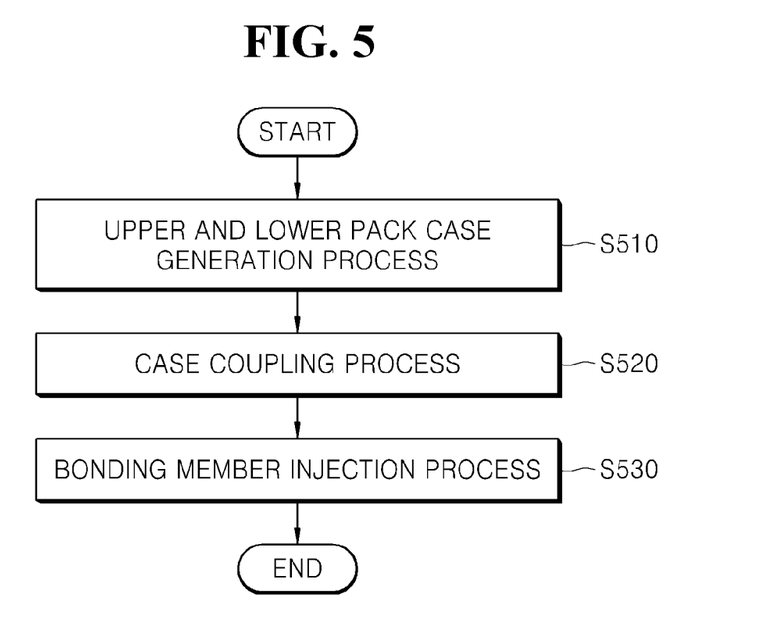
FIG. 5 is a flowchart illustrating a method for manufacturing a battery pack case in accordance with an exemplary embodiment.

FIG. 5 is a flowchart illustrating a method for manufacturing the battery pack case in accordance with an exemplary embodiment.

Referring to FIG. 5, in a method for manufacturing the battery pack case in accordance with an exemplary embodiment, an upper pack case on which a coupling protrusion is formed and a lower pack case in which a coupling groove is formed are formed (an upper and lower pack case generation process (S510)), and coupling protrusion formed on any two surfaces of four side surfaces of the upper pack case and corresponding coupling grooves of the lower pack case are slidably coupled to each other (a case coupling process (S520)).

Then, a bonding member is injected into the coupling groove of the lower pack case (a bonding member injection process (S530)).

Also, each of the processes in the method for manufacturing the battery pack case will be described below in more detail.

The upper and lower pack case generation process (S510) is a process of generating the upper pack case on which the coupling protrusion is formed and the lower pack case in which the coupling groove is formed. An integrated case is formed, and an assembled case formed by injecting the bonding member is formed.

When the assembled case is formed, a pack case assembling process is further performed.

The pack case assembling process will be described in more detail with reference to FIG. 3.

Referring to FIG. 3, a coupling groove 121 having a hook protrusion and formed in a left portion of a panel a is slidably coupled downward to a right coupling protrusion 111 of a panel b (①), and a coupling groove 121 having a hook protrusion and formed in a lower end of the panel a is slidably coupled to the coupling protrusion 111 of the upper end of a panel c from a right direction to a left direction (②). Here, a coupling groove 121 having no hook protrusion on a lower end of the panel b is generally coupled to the left coupling protrusion 111 of a panel c.

Also, a coupling groove 121 having a hook protrusion on a right portion of the panel a is slidably coupled downward to a left coupling protrusion 111 of a panel d (③), and a coupling groove 121 having no hook protrusion on a right portion of the panel c is generally coupled to the coupling protrusion 111 on a lower end of the panel d.

Also, a coupling groove 121 having no hook protrusion on the upper end of the panel a is generally coupled inward to a coupling protrusion 111 on a lower end of a panel e (④), and a coupling protrusion 111 of right and left portions of the panel e is slidably coupled to the coupling groove 121 having the hook protrusion on the upper end of each of the panels b and d.

The case coupling process (S520) is a process of coupling protrusion formed on any facing two surfaces of the four side surfaces of the upper pack case to corresponding coupling grooves of the lower pack case. In more detail, the coupling groove in which the hook protrusion is formed is slidably coupled to the corresponding coupling protrusion.

The two surface except for the any two surfaces which are slidably coupled to each other are generally coupled to each other through the bonding member.

The bonding member injection process (S530) is a process of injecting the bonding member into the coupling groove of the lower pack case. Thus, the upper pack case and the lower pack case may be firmly coupled to each other through the bonding member to prevent moisture from being permeated into the battery pack.

Before the bonding member injection process (S530), an upper pack case fixing process for lifting the upper pack case slidably coupled in the case coupling process (S520) upward to temporarily fix the upper pack case is performed.

Also, after the bonding member injection process (S530), a fixing release process of releasing the fixing of the upper pack case that is temporarily fixed in the upper pack case fixing process is performed.

This process will be described in more described with reference to FIG. 6.

Figure 6:
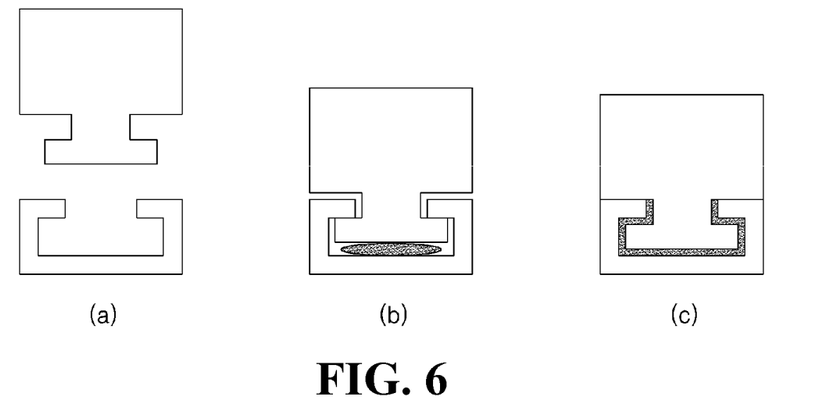
FIG. 6 is a schematic view illustrating a bonding member injection process in the method for manufacturing the battery pack case in accordance with an exemplary embodiment.

FIG. 6 is a schematic view illustrating the bonding member injection process in the method for manufacturing the battery pack case in accordance with an exemplary embodiment.

Referring to FIG. 6, (a) of FIG. 6 illustrates shapes of the coupling protrusion and the coupling groove before case coupling process (S520).

Also, (b) of FIG. 6 illustrates in which, after the case coupling process (S520), the upper pack case fixing process is performed to lift the upper pack case upward at a predetermined height, and then, the bonding member injection process (S530) is performed.

Also, (c) of FIG. 6 illustrates a state in which the fixing release process is performed to allow the bonding member injected into the coupling hole in (b) of FIG. 6 to being uniformly distributed between the coupling protrusion and the coupling groove.

In the battery pack case and the method for manufacturing the same in accordance with the exemplary embodiment, the upper and lower portions of the battery pack case may be simply coupled through the slidable coupling, and the glue may be injected from the outside into the coupled and bonded portion and then be uniformly distributed to effectively perform the waterproof function.

Although the battery pack case and the method for manufacturing the same have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. A battery pack case to accommodate a battery pack in a sealed space within the battery pack case, comprising:

an upper pack case and a lower pack case that are slidably coupled with each other with respect to a first horizontal direction parallel to a lower end of the upper pack case;

a coupling protrusion protruding from an entire periphery of the lower end of a lower frame on four side surfaces of the upper pack case, the four side surfaces of the upper pack case including right, left, front, and rear sides of the upper pack case;

a coupling groove corresponding to the coupling protrusion and defined in an entire end of a upper frame on four side surfaces of the lower pack case, the four side surfaces of the lower pack case including right, left, front, and rear sides of the lower pack case; and a bonding member disposed on a portion at which the coupling protrusion and the coupling groove come into contact with each other and injected into the coupling groove, wherein the lower pack case has an injection hole through which the bonding member is injected into an outer surface in which the coupling groove is defined, wherein the coupling protrusion on each of the right and left sides of the upper pack case includes:
  a protrusion connection part protruding from the lower end of the upper pack case; and
  a coupling part on a distal end of the protrusion connection part to protrude in a second horizontal direction perpendicular with the first horizontal direction such that a width of the protrusion connection part in the second horizontal direction perpendicular to the first horizontal direction is less than a width in the second direction of the coupling part,
wherein the coupling groove of the lower pack case includes a hook protrusion at each of the right and left sides of the lower pack case such that the hook protrusion is slidably coupled to the coupling protrusion such that the hook protrusion is over an upper surface of the coupling part with the coupling part being between the hook protrusion and the lower pack case, and
wherein the hook protrusion is absent at the front side of the lower pack case.

2. The battery pack case of claim 1, wherein the protrusion connection parts of the coupling protrusion disposed on the the right and left sides of the upper pack case have the same height.

3. The battery pack case of claim 1, wherein the coupling protrusion disposed on the right and left sides of the upper pack case have heights different from the coupling protrusion disposed on front and rear sides of the upper pack case.

4. The battery pack case of claim 1, wherein the bonding member is injected in a liquid phase when being injected and is cured after the injection.

5. The battery pack case of claim 1, wherein the coupling part is further provided at the rear side of the upper pack case, and wherein the hook protrusion is further provided at the rear side of the lower pack case rear to receive the coupling part of the rear side of the upper pack case when the upper pack case and the lower pack case are slidably coupled.

* * * * *